Jan. 5, 1954 — A. B. NEWTON — 2,665,059
VENTILATING SHIM FOR FAN SHAFT BEARINGS AND THE LIKE
Filed Nov. 10, 1949
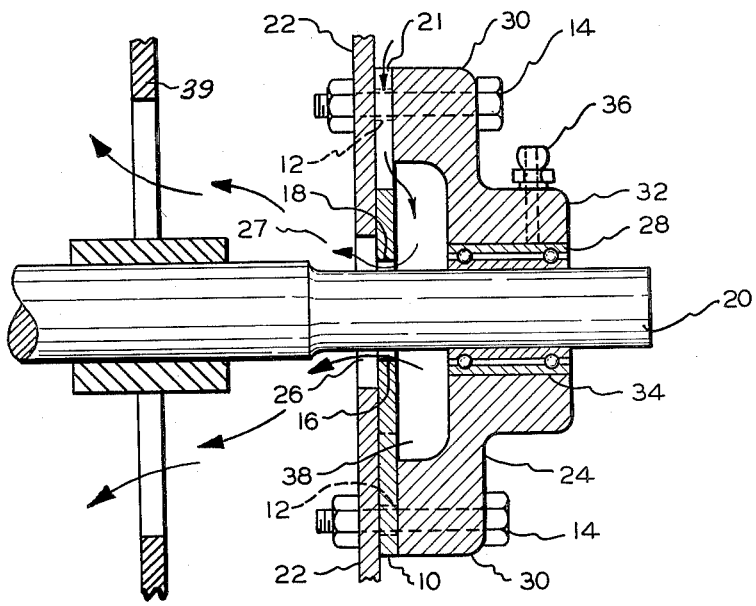
FIG. II.
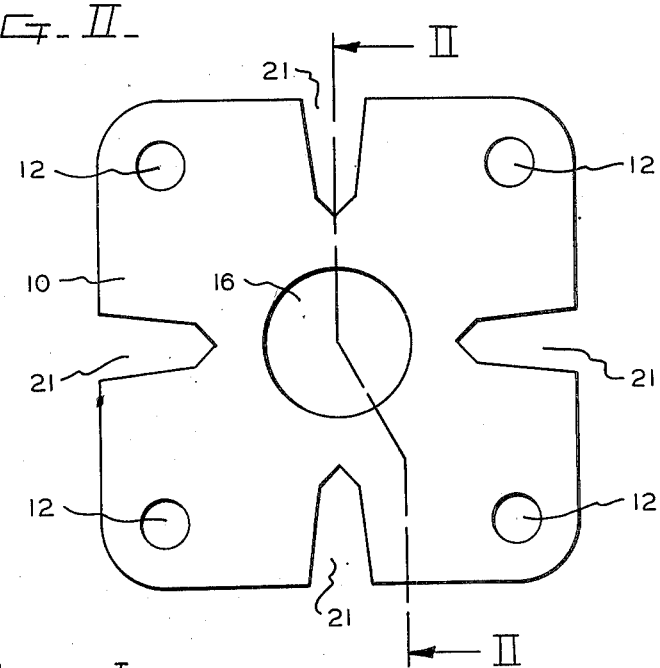
FIG. I.
Inventor
ALWIN B. NEWTON
By Beaman & Patch
ATTORNEYS Patented Jan. 5, 1954

2,665,059

UNITED STATES PATENT OFFICE 2,665,059

VENTILATING SHIM FOR FAN SHAFT BEARINGS AND THE LIKE

Alwin B. Newton, Jackson, Mich., assignor to Acme Industries, Inc., Jackson, Mich., a corporation of Delaware Application November 10, 1949, Serial No. 126,578

5 Claims. (Cl. 230—211)

This invention relates to ventilating devices used for bearings, and more particularly to a ventilating device which is used for a bearing in a stationary housing, the bearing supporting a rotating shaft.

The ventilating shim which is the subject of this invention has particular use with the shaft which supports a rotating fan in a relatively closed housing, the bearing requiring a lubricant and the housing being subjected by reason of the action of the fan, to air pressure which is less than atmospheric. Whereas, the ventilating shim has particular use with this structure, it is recognized that there are many other uses for it.

In a fan housing subjected to lowered air pressure and in which a bearing housing and bearing are tightly seated against the fan housing, it is very common for condensation to seep from the inside of the fan housing into the bearing, resulting in the deterioration thereof. It is likewise very common for the grease in the bearing to migrate into the fan housing by reason of the lowered air pressure therewithin.

To solve the problems presented by such a situation, I have provided a shim adapted to be placed between the fan housing and the bearing housing, said shim being so formed as substantially to balance the air pressure on the outside and inside ends of the bearing, and also being so formed as to provide a current of air between its edge and the shaft so that any condensation which is within the fan housing will not tend to flow into the bearing.

Another advantage to be found in the ventilating shim is that it tends to keep the inner face of the bearing at a temperature approximating that of the outer face, by reason of the air flow across the inner face removing units of heat therefrom.

It is therefore, an object of this invention to provide a ventilating shim which will supply air to the inner side of a bearing.

A further object is to provide a ventilating shim which will prevent the migration of bearing lubricants from the bearing into the housing on which the bearing is mounted due to differential air pressure.

A further object is to provide a shim which will restrict the movement of condensation along the shaft from the housing into the bearing.

Further objects and advantages of my invention will be apparent from a consideration of the following specification and the appended claims in connection with the accompanying drawings, in which:

Fig. I is a plan view of one form of a ventilating shim constructed according to my invention, and Fig. II is a view in section along the line II—II of Fig. I, in which the ventilating shim is exaggerated in thickness for clarity and placed in its operative position between a shaft housing and a bearing housing.

The ventilating shim 10 is of sheet metal of any proper material and thickness, such as steel sheet in the order of 14 gauge, and is shown as substantially square in Fig. I. The shim 10 may be of any desired outside shape. The shim 10 is provided with the required number of apertures 12 through which the fastening means 14 are used to hold the same in a desired position. The central aperture 16 is positioned as shown, and is of a size so that it has a relatively small clearance at the point 18 around the shaft 20, which it embraces.

The shim 10 is also formed with a plurality of slots 21 which are open to the edge of the shim 10. The particular shape of the slots 21 is not important, as long as it is open to the ambient atmosphere and extends towards the central aperture 16 a sufficient distance to insure its functioning in the manner desired.

In operation, the shim 10 is mounted between the fan housing 22 and the bearing housing 24. The fan housing 22 is formed with an aperture 26 through which the shaft 20 projects, and encloses a relatively restricted area which is subjected to lowered air pressure by reason of the action of the fan within the same. This decrease in air pressure is indicated as in the general area shown by the reference character 27.

The bearing housing 24 is attached by the means 14 to the fan housing 22, and houses the bearing 28 in supporting relationship to the shaft 20. The bearing housing 24 is formed with the extending flanges 30, the upstanding central boss 32, and a central aperture 34 in which the bearing 28 is situated. The lubricant is supplied to the bearing 28 through the fitting 36. The bearing housing 24 is formed with an annular internal cavity 38.

In position, as described above, and with the shaft 20 rotating and the fan 39 inducing a decreased air pressure in the area 27, air is allowed to pass through the area defined between the fan housing 22 and the bearing housing 24 in the slots 21, to the central portion of the ventilating shim, and from there into the cavity 38. From the cavity 38 the air is forced, by pressure differential, with increased velocity through the restricted opening 18 between the shaft 20 and the shim 10.

With this construction, and with the flow of air as above described it will be apparent that the air pressure on the internal end of the bearing 28 is substantially equal to the air pressure on the external end of the baring 28. This will prevent the development of a sufficient differential which would cause the lubricant to migrate from the bearing 28 along the shaft 20 into the housing 22.

Likewise, the movement of the air through the slots 21 into the cavity 38 acts continually to cool the inner end of the bearing 28, thereby maintaining the same at a temperature closely approximating that of the outer edge of the bearing 28. By providing the restricted opening 18 between the ventilating shim 10 and the shaft 20, the air is moved therethrough at sufficient velocity by reason of the slight pressure differential, which tends to keep all water vapor and condensation within the fan housing 22 and to prevent the movement of the same into contact with the bearing 28.

Having described my invention, what I claim as new and desire to protect by Letters Patent is:

1. In combination with a fan and a fan housing having a wall, an aperture defined by said wall, a rotatable shaft projecting through said aperture, a bearing housing and bearing mounted on said wall in juxtaposition to said aperture and in supporting relationship to said shaft, said bearing housing defining an internal annular cavity adjacent said shaft, the provision of a ventilating shim comprising a plate, means for mounting said plate between said wall and said bearing housing, a central aperture defined by said plate and adapted to embrace said shaft, and a plurality of open-ended slots defined by said plate, said slots being open to the edge of said plate and extending in a direction substantially toward the center of said plate for a distance between the edge of said bearing housing and the edge of said cavity.

2. In combination with a fan and a fan housing having a wall, an aperture defined by said wall, a rotatable shaft projecting through said aperture, a bearing housing and bearing mounted on said wall in juxtaposition to said aperture and in supporting relationship to said shaft, said bearing housing defining an internal annular cavity adjacent to said shaft, the provision of a ventilating shim comprising a plate, means for mounting said plate between said wall and said bearing housing, a central aperture defined by said plate and adapted to embrace said shaft, and a plurality of slots defined by said plate and extending in a direction substantially toward the center of said plate and of a size to afford communication between the outside of said bearing housing and the inner annular cavity defined by said bearing housing.

3. In combination with a bearing housing having a bearing mounted therein an inner cavity defined by said housing and positioned adjacent said bearing and a shaft supported by said bearing, a ventilating shim for said housing for admitting ambient air thereto, said shim comprising a plate, means for mounting said plate on said bearing housing, an aperture defined by said plate and positioned in substantially coaxial relation with said bearing with the parts in the operative position, and a plurality of slots defined by said plate, said slots extending for a distance greater than the distance between the outer edge of said bearing housing and the edge of said inner cavity whereby communication is afforded between the outside of said bearing housing and said inner cavity.

4. In combination with a bearing housing having a bearing mounted therein an inner cavity defined by said housing and positioned adjacent said bearing and a shaft supported by said bearing, a ventilating shim for said housing for admitting ambient air thereto, said shim comprising a plate, an aperture defined by said plate in position for coaxial alignment with said bearing, and a plurality of slots defined by said plate, said slots extending for a distance greater than the distance between the outer edge of said bearing housing and the edge of said inner cavity whereby communication is afforded between the outside of said bearing housing and said inner cavity.

5. As a new article of manufacture, a ventilating shim for fan shafts adapted to be inserted over the shaft with clearance between the shaft bearing structure and its supporting structure comprising a plate having a central aperture to receive the fan shaft with clearance, open ended slots defined by said plate, said slots being open to the outer edge of said plate and extending inwardly toward said aperture, and means defined in said plate adjacent the outer edge thereof to receive shim locating structure.

ALWIN B. NEWTON.

References Cited in the file of this patent

UNITED STATES PATENTS

| Number | Name | Date |
| --- | --- | --- |
| 1,966,262 | Phillips | July 10, 1934 |
| 1,975,568 | Dubrovin | Oct. 2, 1934 |
| 2,084,863 | Moss | June 22, 1937 |
| 2,391,512 | Ponomareff | Dec. 25, 1945 |
| 2,457,264 | Nygren | Dec. 28, 1948 |

FOREIGN PATENTS

| Number | Country | Date |
| --- | --- | --- |
| 102,578 | Great Britain | Dec. 14, 1916 |